United States Patent
Tsai et al.

(10) Patent No.: US 10,733,706 B2
(45) Date of Patent: Aug. 4, 2020

(54) MOBILE DEVICE, AND IMAGE PROCESSING METHOD FOR MOBILE DEVICE

(71) Applicant: HTC Corporation, Taoyuan (TW)

(72) Inventors: Pei-Chun Tsai, Taoyuan (TW); Kuan-Wei Li, Taoyuan (TW); Ching-Wen Fu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 309 days.

(21) Appl. No.: 15/863,972

(22) Filed: Jan. 7, 2018

(65) Prior Publication Data
US 2019/0213713 A1 Jul. 11, 2019

(51) Int. Cl.
*G06T 5/00* (2006.01)
*G06T 7/194* (2017.01)
*G06T 7/60* (2017.01)
*H04N 9/64* (2006.01)
*H04N 1/387* (2006.01)
*H04N 5/232* (2006.01)
*H04W 88/02* (2009.01)

(52) U.S. Cl.
CPC .............. *G06T 5/002* (2013.01); *G06T 7/194* (2017.01); *G06T 7/60* (2013.01); *H04N 1/3872* (2013.01); *H04N 9/646* (2013.01); *G06T 2207/10024* (2013.01); *G06T 2207/10152* (2013.01); *G06T 2207/30201* (2013.01); *H04N 5/23293* (2013.01); *H04W 88/02* (2013.01)

(58) Field of Classification Search
USPC .................... 382/106, 173, 255, 274–275
See application file for complete search history.

(56) References Cited

U.S. PATENT DOCUMENTS

| | | | | |
|---|---|---|---|---|
| 7,139,019 B2 * | 11/2006 | Kondo | ...................... | G06T 7/20 348/222.1 |
| 7,783,075 B2 * | 8/2010 | Zhang | .................... | H04N 7/147 382/103 |
| 8,346,005 B2 | 1/2013 | Zhang et al. | | |
| 10,432,845 B2 * | 10/2019 | Zeng | .................... | H04N 5/2621 |
| 10,482,583 B1 * | 11/2019 | Suszek | ...................... | G06T 3/40 |
| 2004/0061795 A1 * | 4/2004 | Kondo | .................... | G06T 7/194 348/239 |

(Continued)

FOREIGN PATENT DOCUMENTS

CN    1251148 C    4/2006
CN    101297545 B  5/2012

(Continued)

OTHER PUBLICATIONS

Corresponding Taiwan office action dated Jan. 9, 2020.
Corresponding Taiwan office action dated May 20, 2020.

*Primary Examiner* — Ishrat I Sherali
(74) *Attorney, Agent, or Firm* — CKC & Partners Co., LLC (57) ABSTRACT

An image processing method, suitable for a mobile device including a camera unit and a display unit, includes separating a foreground portion and a background portion of a first image sensed by the camera unit, calculating a dimension of the foreground portion, generating an adjustment level in positively correlated with the dimension, applying an image effect at the adjustment level to the foreground or the background portion of the first image to generate a second image, and displaying the second image on the display unit.

20 Claims, 10 Drawing Sheets

(56) References Cited

U.S. PATENT DOCUMENTS

| | | | |
|---|---|---|---|
| 2011/0069884 A1* | 3/2011 | Zhang | G06K 9/3233 |
| | | | 382/173 |
| 2014/0184586 A1* | 7/2014 | Kelley | H04N 5/23212 |
| | | | 345/419 |
| 2015/0379740 A1* | 12/2015 | Yang | G06T 5/50 |
| | | | 348/222.1 |

FOREIGN PATENT DOCUMENTS

| | | |
|---|---|---|
| CN | 102918861 A | 2/2013 |
| CN | 106664374 A | 5/2017 |
| TW | I554936 B | 10/2016 |

* cited by examiner

MOBILE DEVICE, AND IMAGE PROCESSING METHOD FOR MOBILE DEVICE

BACKGROUND

Technical Field

The present disclosure relates to a mobile device and an image processing method. More particularly, the present disclosure relates to a mobile device with a camera and an image processing method suitable for a mobile device.

Description of Related Art

Nowadays, to take pictures anywhere and anytime is becoming a necessity in many people's daily life. As more and more people relay on mobile devices to take pictures, camera functions of the mobile devices have got more attention.

Hence, many functions such as camera effects have been developed, while the camera effects such as brightness, saturation and bokeh effect have been applied to photos to enhance their qualities.

However, how to make those functions more accessible and to improve the photos in an easy way with its quality much closer to those taken by a monocular camera are still challenging.

SUMMARY

One aspect of the present disclosure is related to an image processing method. In accordance with one embodiment of the present disclosure, the image processing method includes separating a foreground portion and a background portion of a first image sensed by the camera unit, calculating a dimension of the foreground portion, generating an adjustment level in positively correlated with the dimension, applying an image effect at the adjustment level to the foreground or the background portion of the first image to generate a second image, and displaying the second image on the display unit.

Another aspect of the present disclosure is related to a mobile device. In accordance with one embodiment of the present disclosure, the mobile device includes a camera unit, a display unit and a processing unit. The camera unit is configured to sense a first image. The processing unit is coupled to the camera unit and the display unit, the processing unit is configured to separate a foreground portion and a background portion of the first image, to calculate a dimension of the foreground portion, to generate an adjustment level in positively correlated with the dimension, to apply an image effect at the adjustment level to the foreground or the background portion of the first image to generate a second image, and to transmit the second image to the display unit to display the second image.

Through the operations of one embodiment described above, the mobile device 100 can generate a processed image with adaptive image effect according to the dynamic dimension of the target object. In addition, the applied portion (e.g., the foreground portion or the background portion) of the captured image and the adjustment level of the image effect can be adjusted quickly and intuitively with the distance between the target object and the mobile device 100, such that a user can adjust the adjustment level of the image effect applied on the captured image by moving the mobile device 100 without using any additional user interface.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

One embodiment of the present disclosure is related to a mobile device including a camera. In the paragraphs below, a smart phone will be taken as an example to describe details of the camera device. However, another camera device, such as a tablet computer or a camera, is within the contemplated scope of the present disclosure.

Figure 1:
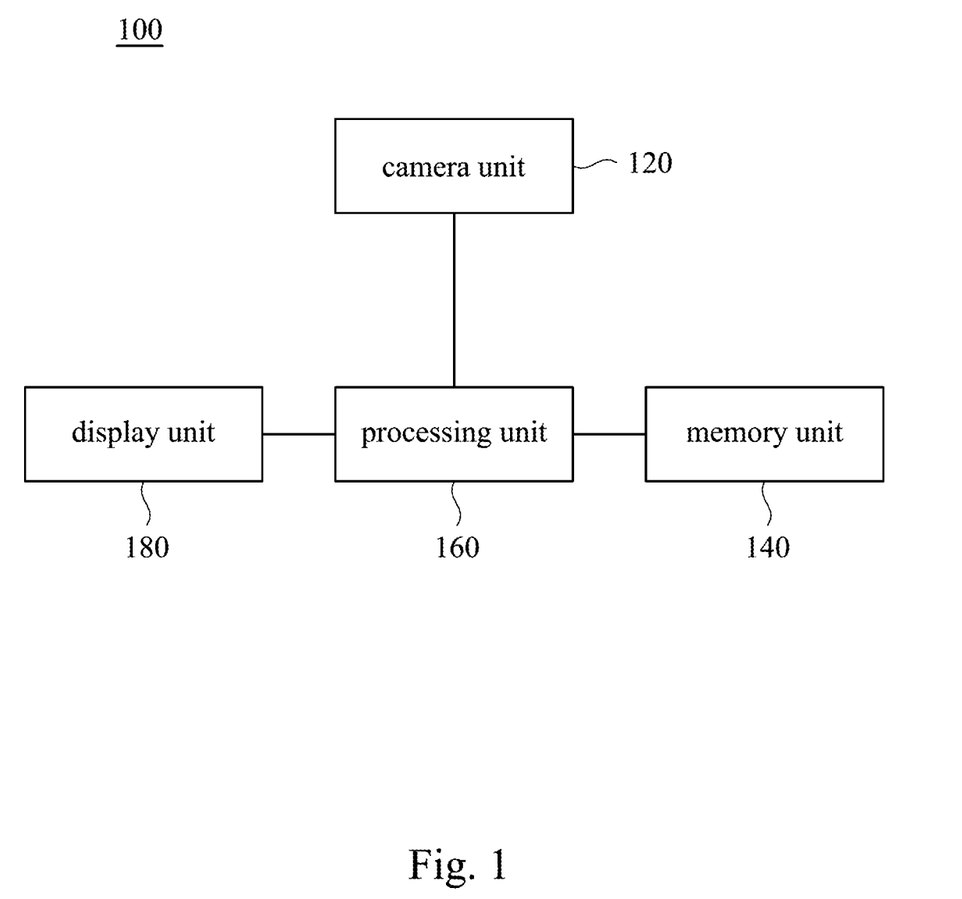
FIG. 1 is a schematic block diagram of a mobile device in accordance with one embodiment of the present disclosure.

FIG. 1 is a schematic block diagram of a mobile device 100 in accordance with one embodiment of the present disclosure. As shown, the mobile device 100 includes a camera unit 120, a memory unit 140, a processing unit 160 and a display unit 180. In this embodiment, the processing unit 160 is electrically connected to the camera unit 120, the memory unit 140 and the processing unit 160.

In one embodiment, the camera unit 120 is configured to capture an image covering a field of view in front of the camera unit 120.

In an embodiment, the image can be a preview image, which is dynamically changing in real time according to a current view in front of the camera unit 120. In one embodiment, the camera unit 120 includes, for example, a front camera disposed on a front surface of the mobile device 100, a rear camera disposed on a back surface of the mobile device 100, or a combination of dual cameras disposed on one side of the mobile device 100, but is not limited in this regard.

In one embodiment, the memory unit 140 is configured to store the image captured by the camera unit 120 and to provide the image to the processing unit 160. In one embodiment, the memory unit 140 can be realized by, for example, a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art is within the contemplated scope of the present disclosure.

In one embodiment, the processing unit 160 is configured to run or execute various software programs and/or sets of instructions to perform various functions for the mobile device 100 and to process data. In one embodiment, the processing unit 160 is configured to fetch the image stored in the memory unit 140 (or fetch the image directly from the camera unit 120) and to generate a processed image based on the original image captured by the camera unit 120. In one embodiment, the processing unit 160 can be realized by, for example, one or more processors, such as central processors and/or microprocessors, but are not limited in this regard.

In one embodiment, the display unit 180 is configured to display the image captured by the camera unit 120 and/or the processed image generated by the processing unit 160. In one embodiment, the display unit 180 can be realized by, for example, a display, such as a liquid crystal display or an active matrix organic light emitting diode (AMOLED) display, but is not limited in this regard.

Figure 2:
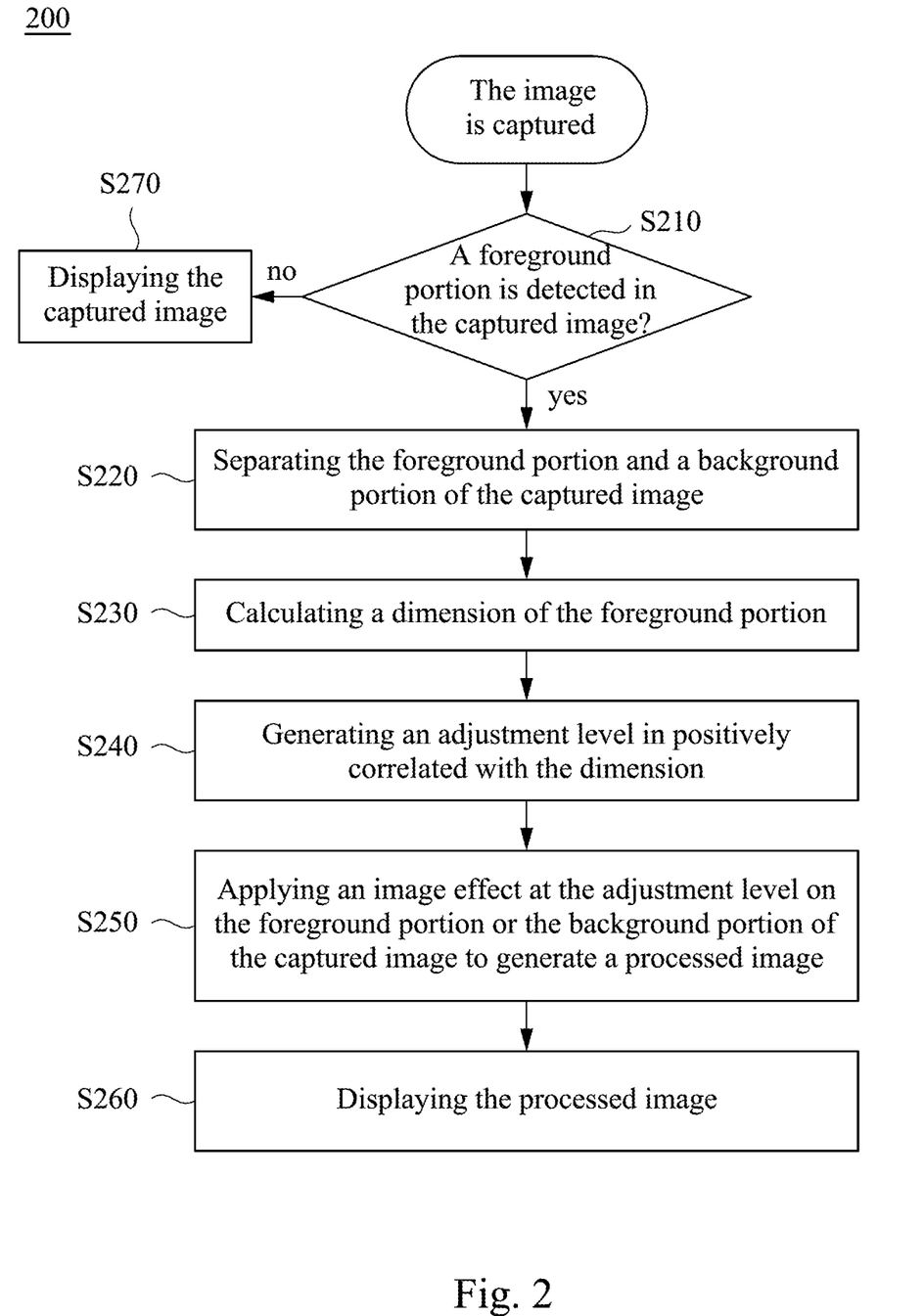
FIG. 2 is a flowchart of an image processing method of the mobile device in FIG. 1, in accordance with one embodiment of the present disclosure.

Details of the present disclosure are described in the paragraphs below with reference to an image processing method in FIG. 2, in which FIG. 2 is a flowchart of an image processing method 200 suitable to be applied on the mobile device 100 in FIG. 1, in accordance with one embodiment of the present disclosure. However, the present disclosure is not limited to the embodiment below.

It should be noted that the image processing method 200 can be applied to a mobile device having a structure that is the same as or similar to the structure of the mobile device 100 shown in FIG. 1. To simplify the description below, the embodiment shown in FIG. 1 will be used as an example to describe the image processing method according to an embodiment of the present disclosure. However, the present disclosure is not limited to application to the embodiment shown in FIG. 1.

It should be noted that, in some embodiments, the image processing method 200 may be implemented as a computer program. When the computer program is executed by a computer, an electronic device, or the processing unit 160 in FIG. 1, this executing device performs the image processing method 200.

In addition, it should be noted that in the operations of the following image processing method, no particular sequence is required unless otherwise specified. Moreover, the following operations also may be performed simultaneously or the execution times thereof may at least partially overlap.

Furthermore, the operations of the following image processing method may be added to, replaced, and/or eliminated as appropriate, in accordance with various embodiments of the present disclosure.

Reference is made to FIGS. 1 and 2. The image processing method 200 includes the operations below.

Figure 3A:
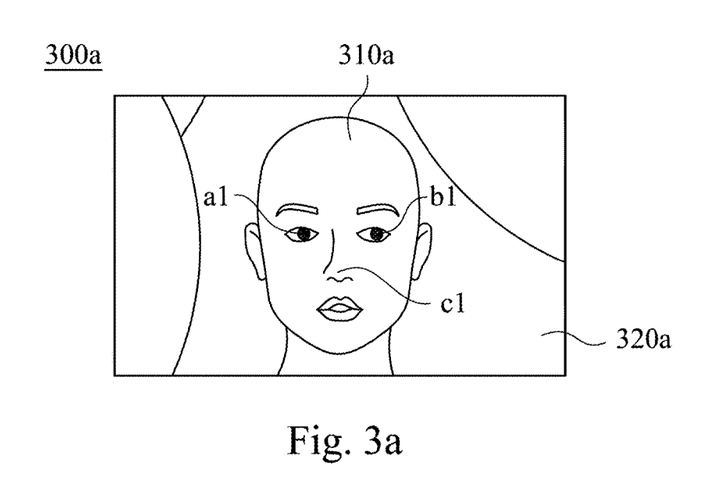
FIG. 3a is a schematic diagram illustrating the original captured image according to an embodiment of the disclosure.

When the image is captured by the camera unit 120, the image processing method 200 is performed by the mobile device 100, such that the original captured image will be processed into a processed image according to a distribution of a foreground portion and a background portion in the original captured image. Reference is also made to FIG. 3a, which is a schematic diagram illustrating the original captured image 300a according to an embodiment of the disclosure.

In operation S210, the processing unit 160 determines whether a foreground portion is detected or not in the image 300a captured by the camera unit 120. In one embodiment, the processing unit 160 detects the foreground portion 310a of the captured image 300a by using a face detection and recognition system.

In the embodiment shown in FIG. 3a, a face will be detected as the foreground portion 310a, and then the image processing method 200 performs operation S220. On the other hand, if no foreground portion can be recognized in the captured image (e.g., there is no target, near object or no topic existed in the captured image), operation S270 is performed to display the captured image on the display unit 180.

In one embodiment, the processing unit 160 determines whether the image 300a contains the foreground portion 310a in several approaches. In one approach, the processing unit 160 uses the dual cameras of the mobile device 100 to examine a depth map of objects within the image 300a, and the processing unit 160 can distinguish the foreground portion 310a from the image 300a according to the depth map. In another approach, the processing unit 160 selects an object with the biggest size in the image 300a as the foreground portion 310a.

In operation S220, the processing unit 160 separates the foreground portion 310a and a background portion 320a of the captured image 300a. In this operation, the processing unit separates the foreground portion 310a and the background portion 320a according to the detected foreground portion 310a and the rest portion of the captured image. A depth of the background portion 320a is greater than a depth of the foreground portion 310a.

In operation S230, the processing unit 160 calculates a dimension of the foreground portion 310a. In this operation, the processing unit 160 uses several approaches to calculate the dimension of the foreground portion 310a, in which these approaches will be discussed below in FIGS. 6a-6d. In one embodiment, the dimension of the foreground portion 310a can be a distance between two eyes a1 and b1. In another embodiment, the dimension of the foreground portion 310a can be a size of the triangular area formed between these two eyes a1 and b1 and a nose c1. In still another embodiment, the dimension of the foreground portion 310a can be represented by a size of the foreground portion 310a. In still another embodiment, the dimension of the foreground portion 310a can be represented by a percentage between a size of the foreground portion 310a and a size of the whole captured image 300a.

Figure 3B:
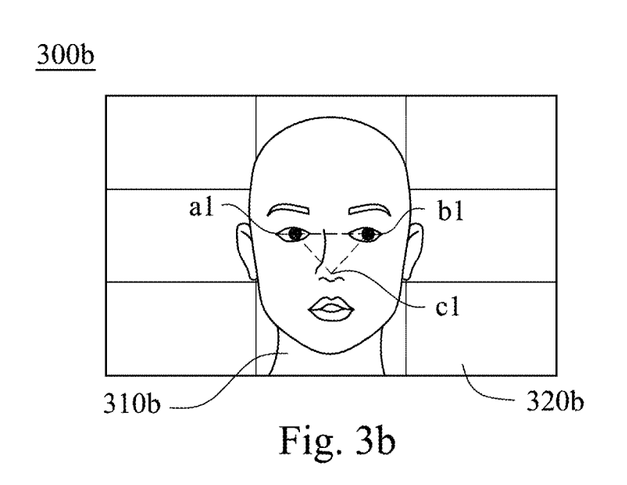
FIG. 3b is a schematic diagram illustrating the processed image according to an embodiment of the disclosure.
Figure 3C:
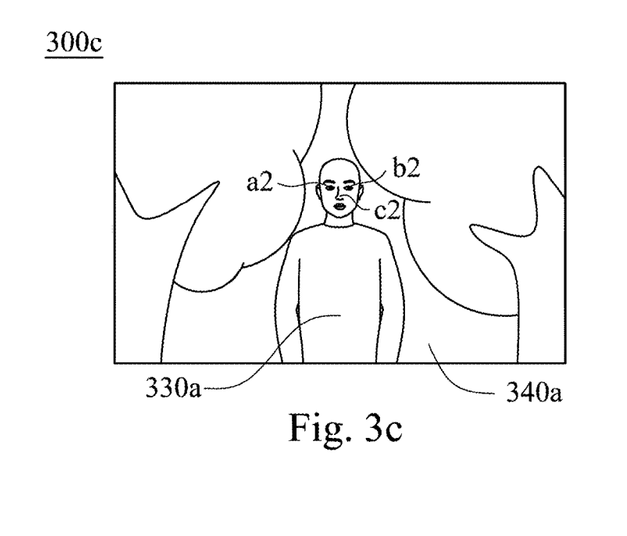
FIG. 3c is a schematic diagram illustrating the original captured image according to an embodiment of the disclosure.

Reference is also made to FIG. 3c, which is a schematic diagram illustrating another captured image 300c. As shown in FIG. 3c, a foreground portion 330a is detected in the captured image 300c. The captured image 300c as shown in FIG. 3c is captured relatively away from the foreground portion 330a (compared to the captured image 300a shown in FIG. 3a). In the case, the dimension of the foreground portion 330a in the captured image 300c is relatively smaller than the dimension of the foreground portion 310a in the captured image 300a.

In operation S240, the processing unit 160 generates an adjustment level in positively correlated with the dimension of the captured image 300a/300c. In one embodiment, the adjustment level is correlated to an image effect, in which the image effect includes, for example, brightness, saturation, brush strokes, bokeh, but is not limited in this regard. In one embodiment, the dimension of the foreground portion 310a in the captured image 300a is larger than the dimension of the foreground portion 330a in the captured image 300c, such that the adjustment level generated corresponding to the captured image 300a is larger than the adjustment level generated corresponding to the captured image 300c.

In operation S250, the processing unit 160 applies an image effect at the adjustment level on the foreground portion 310a/330a or the background portion 320a/340a of the captured image 300a/300c to generate a processed image 300b/300d with the same foreground portion 310b/330b and a blurred background portion 320b/340b. In this embodiment, the image effect applied to FIG. 3a and FIG. 3c is a bokeh effect, and the adjustment level is a bokeh level. Since the adjustment level corresponding to the captured image 300a is larger than the adjustment level generated corresponding to the captured image 300c in the operation S240, the bokeh level corresponding to the captured image 300a is larger than the adjustment level generated corresponding to the captured image 300c. In this embodiment, the processing unit 160 applies the bokeh effect at the bokeh level to the background portion 320a/340a of the captured image 300a/300c to generate the processed image 300b/300d.

Figure 3D:
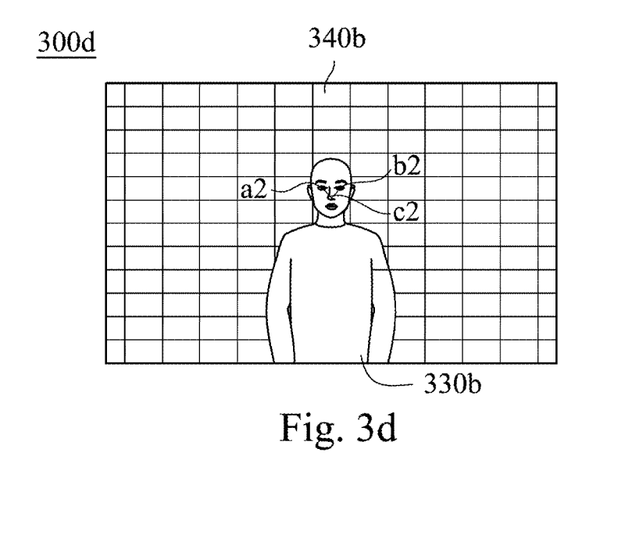
FIG. 3d is a schematic diagram illustrating the processed image according to an embodiment of the disclosure.

In operation S260, the display unit 180 displays the processed image 300b/300d. In this embodiment, since the bokeh level applied to the captured image 300a is larger than the bokeh level applied to the captured image 300c according to the dimension of the foreground portion 310a/330a, the background portion 320b in the processed image 300b is more blurred than the background portion 340b in the processed image 300d (as shown in FIG. 3b and FIG. 3d). In one embodiment, the display unit 180 displays the processed image and the original captured image on the screen (not shown) of the mobile device 100 at the same time.

Figure 4A:
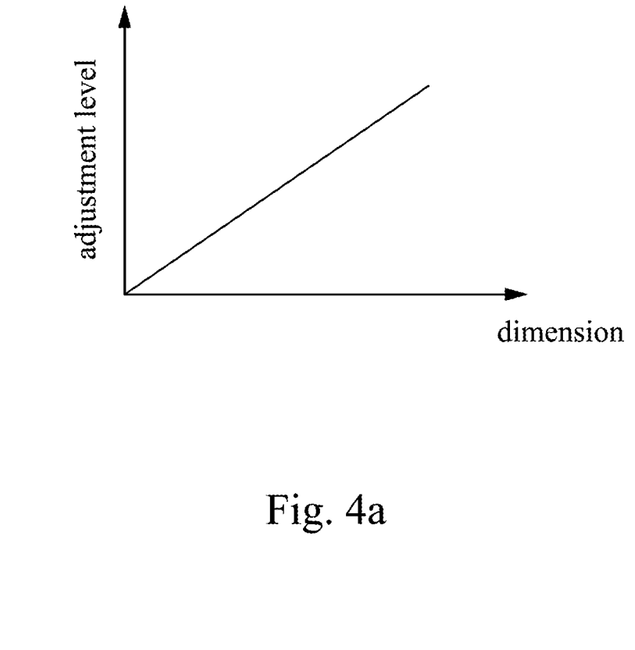
FIG. 4a is a graph of a relationship between an adjustment level and a dimension of the foreground portion in accordance with one embodiment of the present disclosure.

As shown in aforesaid embodiment of the operation S240, the adjustment level is positively correlated to the dimension of the foreground portion 310a/330a in FIG. 3a or FIG. 3c. The relationship between the adjustment level and the dimension of the foreground portion are further illustrated in FIGS. 4a and 4b. In one embodiment, the relationship between the adjustment level and the dimension of the foreground portion is further illustrated in FIG. 4a, in which FIG. 4a is a graph of a function of a relationship between the adjustment level and the dimension of the foreground portion in accordance with one embodiment of the present disclosure. The adjustment level increases linearly with the dimension of the foreground portion, in which the adjustment level is, for example, from 1 to 100. The adjustment level is gradually increasing with the dimension of the foreground portion. When the dimension of the foreground portion is 5% of the whole captured image, the adjustment level is configured to be 5. When the dimension of the foreground portion is 40% of the whole captured image, the adjustment level is configured to be 40.

Figure 4B:
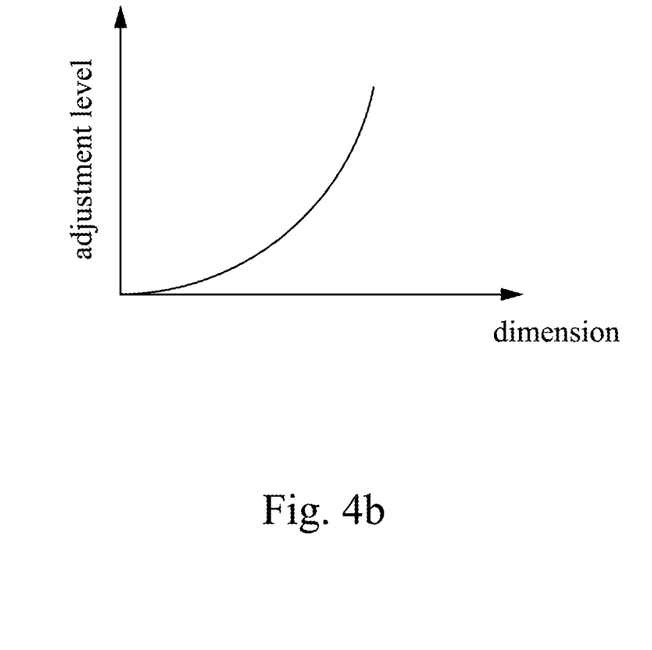
FIG. 4b is a graph of a relationship between the adjustment level and the dimension of the foreground portion in accordance with one embodiment of the present disclosure.

In one embodiment, the relationship between the adjustment level and the dimension of the foreground portion is further illustrated in FIG. 4b, in which FIG. 4b is a graph of a function of a relationship between the adjustment level and the dimension of the foreground portion in accordance with one embodiment of the present disclosure. The adjustment level increases exponentially with the dimension of the foreground portion, in which the adjustment level is, for example, from 1 to 100. The adjustment level is smoothly increasing with the dimension of the foreground portion as the dimension of the foreground portion is relatively small, and the adjustment level is dramatically increasing with the dimension of the foreground portion as the dimension of the foreground portion is relatively large. When the dimension of the foreground portion is 5% of the whole captured image, the adjustment level is configured to be 2. When the dimension of the foreground portion is 10% of the whole captured image, the adjustment level is configured to be 3. When the dimension of the foreground portion is 80% of the whole captured image, the adjustment level is configured to be 50. At the dimension of the foreground portion is 90% of the whole captured image, the adjustment level is configured to be 80.

In aforesaid embodiments, the image effect in operation S250 is applied to the foreground portion 310b/330b (such as FIG. 3b and FIG. 3d). However, the disclosure is not limited thereto. Reference is made to FIGS. 5a-5d, in which FIGS. 5a-5d illustrate an illustrative example of the image processing method in FIG. 2, in accordance with one embodiment of the present disclosure. In this illustrative example, the image effect in operation S250 is applied to the foreground portion and the background portion alternatively according to the dimension of the foreground portion. As shown in FIGS. 5a-5d, the processed images 500a, 500b, 500c and 500d displayed on the display unit 180 include foreground portions 510a, 510b, 510c, 510d and background portions 520a, 520b, 520c, 520d respectively.

Figure 5A:
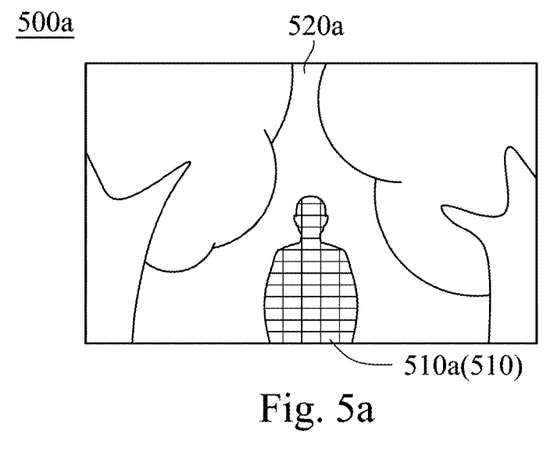
FIGS. 5a-5d illustrate an illustrative example of the image processing method in FIG. 2, in accordance with one embodiment of the present disclosure.
Figure 5B:
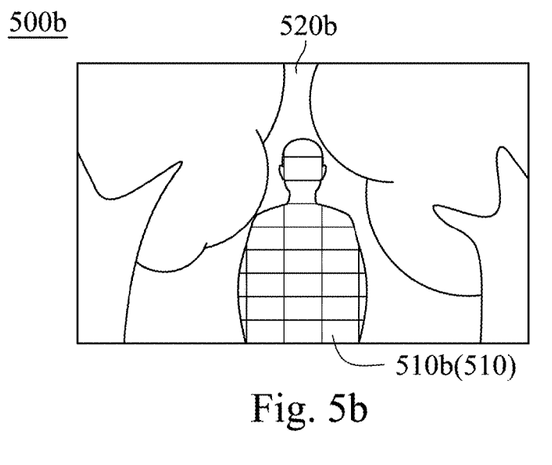
Figure 5C:
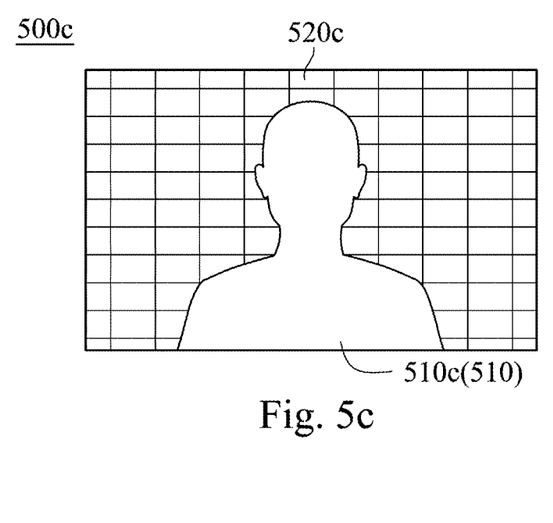
Figure 5D:
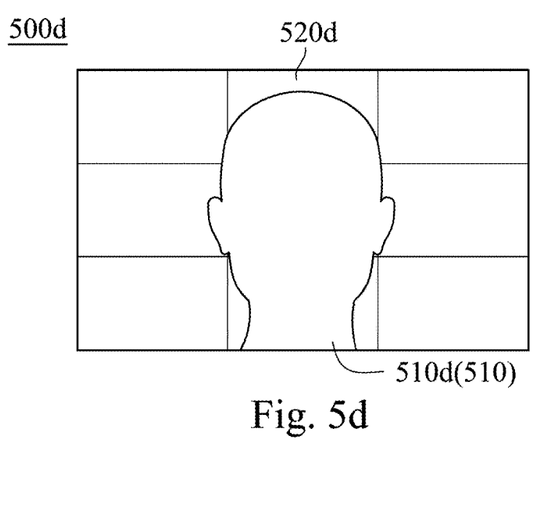

In this illustrative example, the image effects are applied to the foreground portions 510a and 510b, as shown in FIGS. 5a and 5b, when the dimension of the foreground portion 510 is under a certain threshold, and the image effects are applied to the background portions 520c and 520d, as shown in FIGS. 5c and 5d, when the dimension of the foreground portion 510 exceeds the certain threshold. In one embodiment, the certain threshold can be 50% of the whole processed images 500a, 500b, 500c and 500d.

In aforesaid embodiment, the dimension of the foreground portion 310/330, is measured in a percentage of the foreground portion 310/330 relative to the whole captured image 300a/300c. However, the dimension of the foreground portion 310/330 is not limited to be measured in the percentage. The dimension of the foreground portion 310/330 can also be measured in a length, a width, an area volume, a pixel count and/or other equivalent units. Reference is also made to FIG. 6a to FIG. 6d. FIG. 6a to FIG. 6d a partial flowchart of the image processing method 200 in FIG. 2 in accordance with one embodiment of the present disclosure.

Figure 6A:
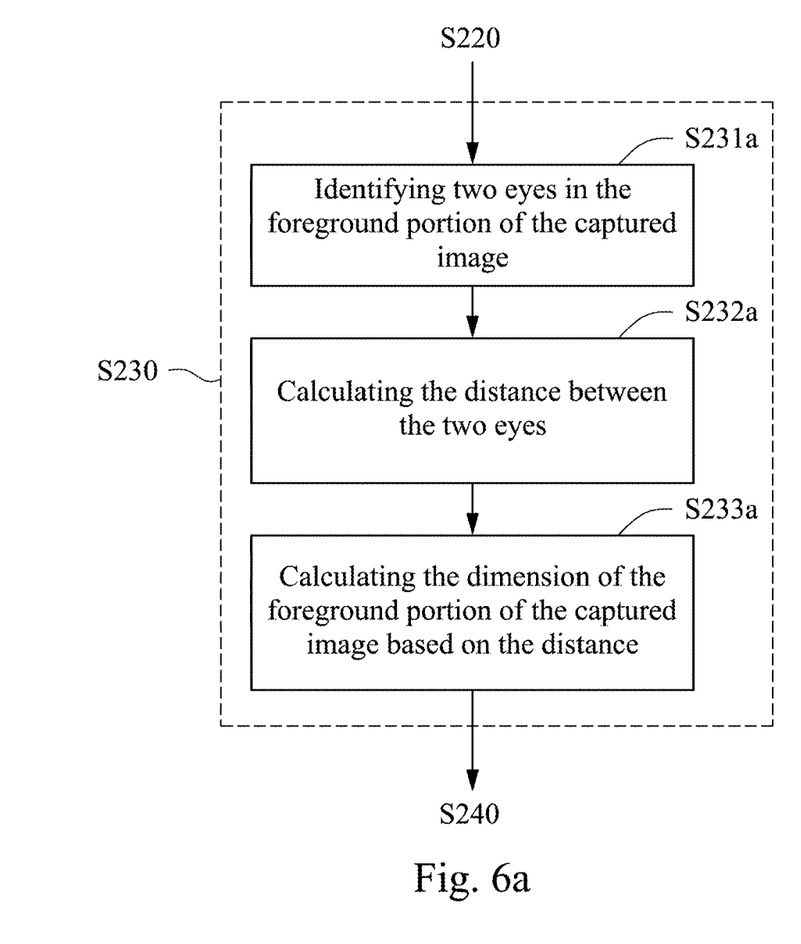
FIG. 6a is a partial flowchart of an image processing method in accordance with one embodiment of the present disclosure.

FIG. 6a is a partial flowchart of the image processing method 200 in accordance with one embodiment of the present disclosure.

In operation S231a, the processing unit 160 identifies two eyes in the foreground portion 310a/330a.

In operation S232a, the processing unit 160 calculates the distance between the two eyes in the foreground portion 310a/330a of the captured images 300a/300c.

In operation S233a, the processing unit 160 calculates the dimension of the foreground portion 310a/330a based on the distance obtained in operation S232a. In this embodiment, the dimension of the foreground portion 310a/330a is represented by the distance obtained in operation S232a.

Figure 6B:
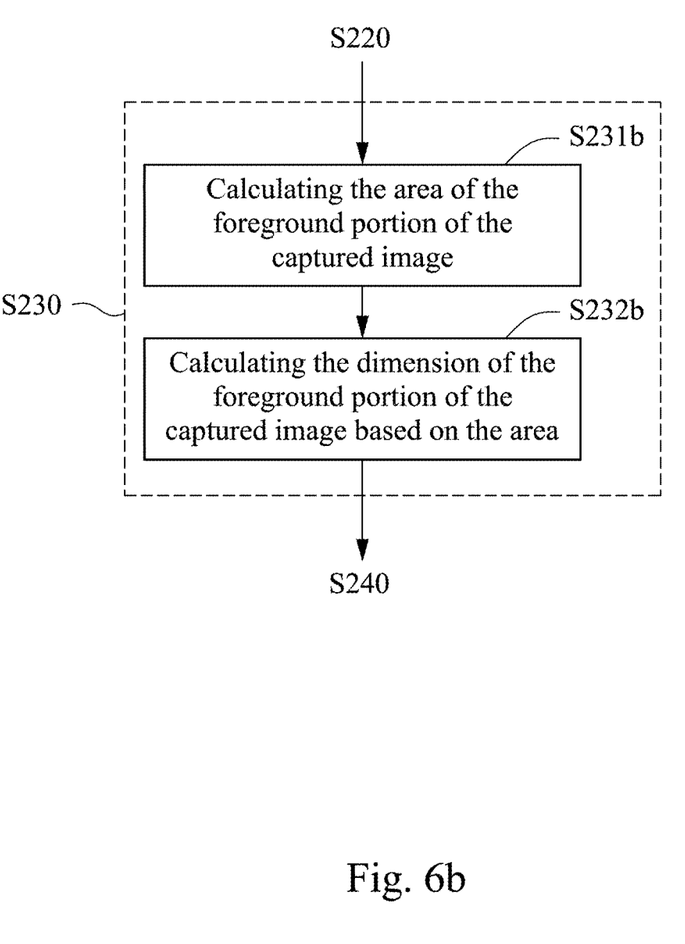
FIG. 6b is a partial flowchart of an image processing method in accordance with one embodiment of the present disclosure.

In different embodiments, operation S230 of FIG. 2 may further include operations S231b and S232b, as shown in FIG. 6b. FIG. 6b is a partial flowchart of an image processing method 200 in accordance with one embodiment of the present disclosure.

In operation S231b, the processing unit 160 calculates the area of the foreground portion 310a/330a. For example, the area may be a triangular area formed between two eyes a1/a2 and b1/b2 and a nose c1/c2 on the face (as shown in FIGS. 3a-3d). In another example, the area of the foreground portion can be measured according to an area of the face (e.g., the foreground portion 310a as shown in FIG. 3a). In another example, the area of the foreground portion can be measured according to the area of a person in the foreground portion of the captured image (e.g., the foreground portion 330a as shown in FIG. 3c).

In operation S232b, the processing unit 160 calculates the dimension of the foreground portion based on the area obtained in operation S231b. In this embodiment, the dimension of the foreground portion 310a/330a is represented by the area obtained in operation S231b.

In operation S232b, the processing unit 160 calculates the dimension of the foreground portion based on the area obtained in operation S231b. In this embodiment, the dimension of the foreground portion 310a/330a/510 is represented by the area obtained in operation S231b.

Figure 6C:
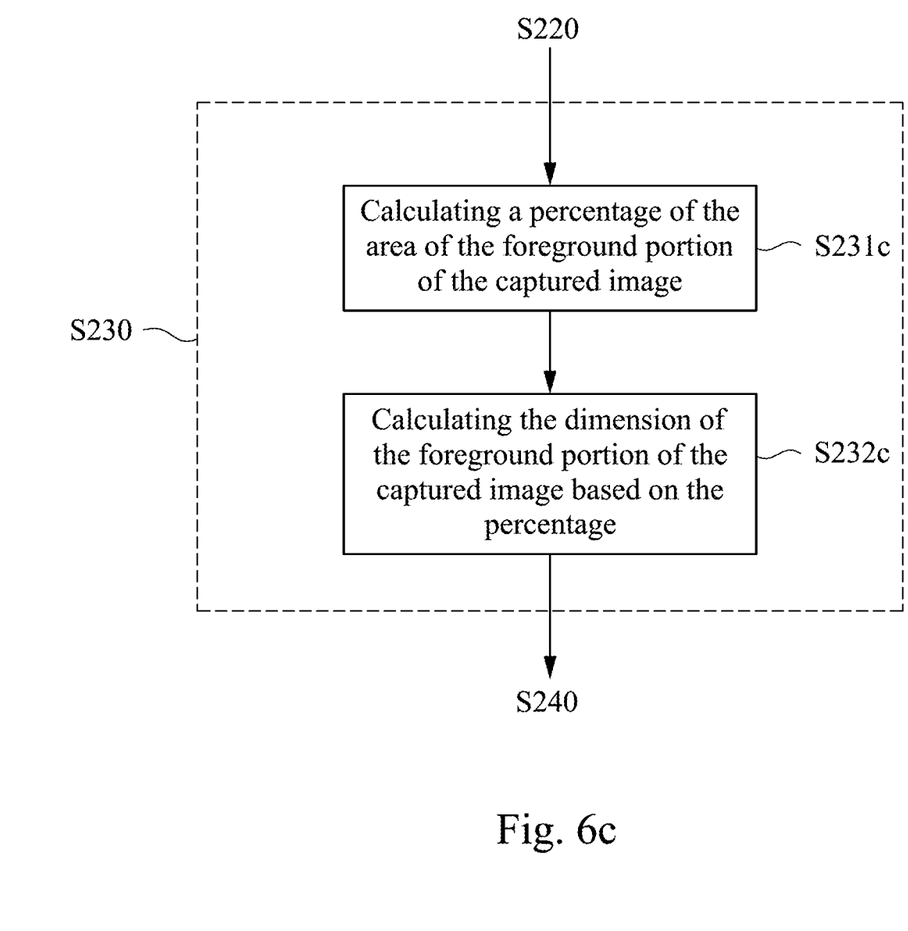
FIG. 6c is a partial flowchart of an image processing method in accordance with one embodiment of the present disclosure.

In operation S231c, the processing unit 160 calculates a percentage of the area of the foreground portion 310a/330a relative to the whole captured images 300a/300c.

In operation S232c, the processing unit 160 calculates the dimension of the foreground portion 310a/330 based on the percentage obtained in operation S231c. In this embodiment, the dimension of the foreground portion 310a/330a represented by the percentage obtained in operation S231c.

Figure 6D:
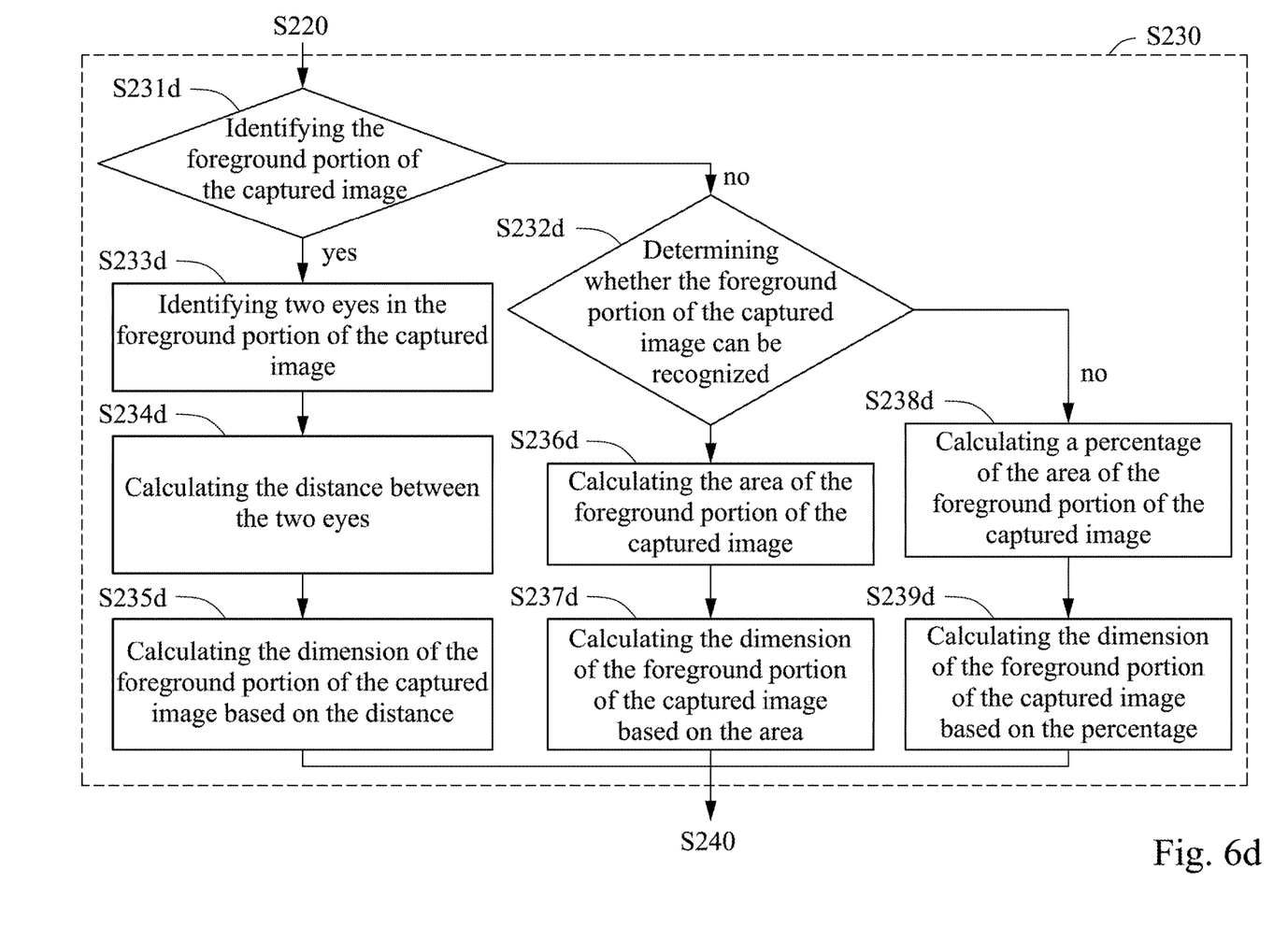
FIG. 6d is a partial flowchart of an image processing method in accordance with one embodiment of the present disclosure.

In different embodiments, the operation S230 of FIG. 2 may include operations S231d-S239d as shown in FIG. 6d. FIG. 6d is a partial flowchart of an image processing method 200 in accordance with one embodiment of the present disclosure.

In operation S231d, the processing unit 160 identifies the foreground portion 310a/330a in the captured image 300a/300c. In this operation, the processing unit 160 determines whether the captured images 300a/300c include a face. If so, operation S233d will be continuously performed. If not, operation S232d will be performed.

In operation 233d, the processing unit 160 identifies two eyes a1/a2 and b1/b2 on the face in foreground portion 310a/330a.

In operation S234d, the processing unit 160 calculates the distance between the two eyes a1/a2 and b1/b2. In another embodiment of the operation S234d, the processing unit 160 calculates a triangular area formed between the two eyes a1/a2 and b1/b2 and a nose c1/c2 on the face, as shown above in the operation S231b in FIG. 6b.

In operation S235d, the processing unit 160 calculates the dimension of the foreground portion based on the distance obtained in operation S234d. In this embodiment, the dimension of the foreground portion 310a/330a is represented by the distance obtained in operation S234a.

Figure 7A:
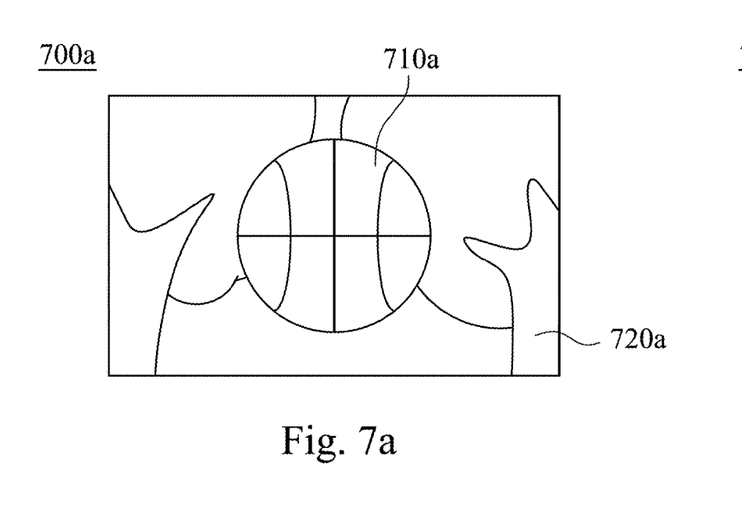
FIG. 7a is a schematic diagrams illustrating captured image according to some embodiments of the disclosure.

In the operation S231d, the processing unit 160 determines whether the captured image 300a/300c includes any face. Reference is also made to FIG. 7a and FIG. 7c, which are schematic diagrams illustrating captured images 700a and 700c according to some embodiments of the disclosure. As shown in FIG. 7a and FIG. 7c, the captured images 700a/700c do not include any face, and the captured images 700a/700c include a round shaped object located at the foreground portion 710a/730a in the images. The operation S232d is performed by the processing unit 160 to determine whether the foreground portion 710a/730a can be recognized.

In operation S232d, the processing unit 160 determines whether the foreground portion 710a/730a can be recognized. In this operation, the processing unit 160 uses a recognition system to determine the object included in the foreground portion 710a or 730a. In this case, the object included in the foreground portion 710a or 730a can be recognized as a basketball, the image processing method 200 performs operation S236d. On the other hand, if no foreground portion can be recognized, the operation S238d is performed to use the percentage of the area of the foreground portion to represent the dimension of the foreground portion.

In operation S236d, the processing unit 160 calculates the area of the foreground portion 710a or 730a.

In operation S237d, the processing unit 160 calculates the dimension of the foreground portion 710a or 730a based on the area obtained in operation S236d. In this embodiment, the dimension of the foreground portion 710a or 730a is represented by the area obtained in operation S236d. In this case, the dimension of the foreground portion 710a or 730a also considers recognition information of the foreground portion 710a or 730a (i.e., the foreground portion 710a or 730a is recognized to be the basketball). For example, the recognition information includes a real size of a standard basketball.

In one embodiment, the dimension of the foreground portion is fine-tuning with the real size of the recognized foreground portion, for example, the dimension of the foreground portion is adjusted to be smaller as the real size of the recognized foreground portion is relatively large, and the dimension of the foreground portion is adjusted to be larger as the real size of the recognized foreground portion is relatively small.

If the foreground portion cannot be recognized, the operation S238d is performed by the processing unit 160 to a percentage of the area of the foreground portion of the captured image.

In operation S239d, the processing unit 160 calculates the dimension of the foreground portion based on the percentage obtained in operation S238d. In this embodiment, the dimension of the foreground portion is represented by the percentage obtained in operation S238d.

The aforesaid embodiments are focused on applying the image effect to a captured image with its foreground portion containing face, but applying the image effect to the captured image with its foreground portion containing objects of different shape is within the contemplated scope of the present disclosure. The following embodiments are illustrated in a round shape, as shown in FIGS. 7a-7d.

Reference is made to FIGS. 7a-7d, in which FIGS. 7a-7d are schematic diagrams illustrating captured images 700a/700c according to some embodiments of the disclosure. In the case, the captured image 700a/700c displayed on the display unit 180 includes a foreground portion 710a/730a and a background portion 720a/740a, in which the foreground portion 710a/730a is a target object (i.e. a basketball). The target object may be a ball, a cell phone, a watch, or any object is within the contemplated scope of the present disclosure. In this illustrative example, the image effect applied to FIG. 7a and FIG. 7c is a bokeh effect, and the adjustment level is a bokeh level.

By means of operations S210-S260 in FIG. 2, the processing unit 160 processes the captured image 700a/700c to obtain a processed image 700b/700d with a blurred background portion 720b/740b.

Figure 7B:
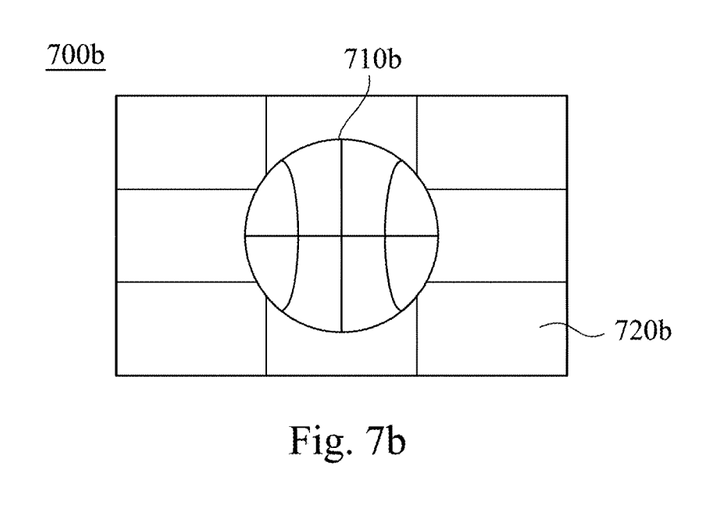
FIG. 7b is a schematic diagrams illustrating captured image according to some embodiments of the disclosure.
Figure 7C:
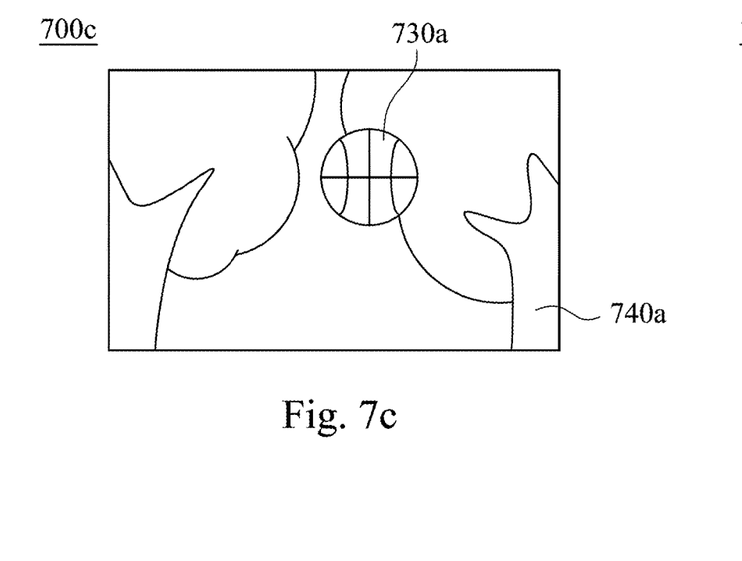
FIG. 7c is a schematic diagrams illustrating captured image according to some embodiments of the disclosure.
Figure 7D:
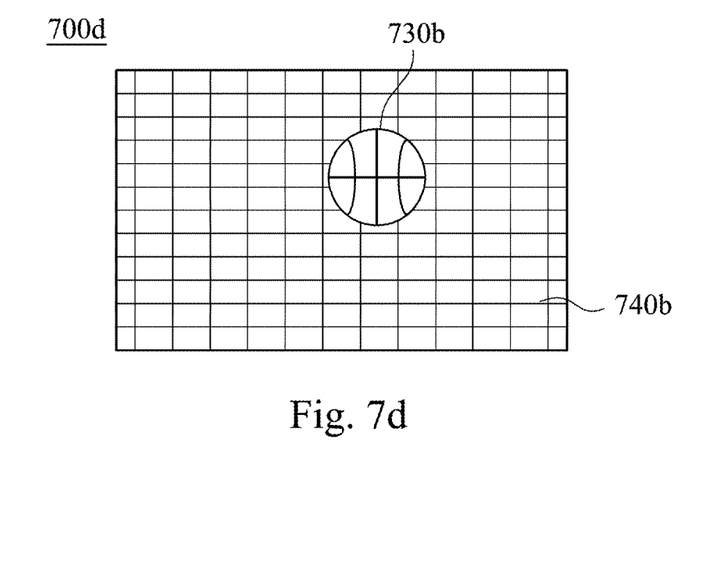
FIG. 7d is a schematic diagrams illustrating captured image according to some embodiments of the disclosure.

In this embodiment, since the dimension of the foreground portion 710a is larger than the foreground portion 730a, the background portion 720b in the processed image 700b is more blurred than the background portion 740b in the processed image 700d (as shown in FIG. 7b and FIG. 7d).

The image effect mentioned in aforesaid embodiments is the bokeh effect for demonstration, but various image effects, for example, brightness, saturation, brush strokes are also within the contemplated scope of the present disclosure.

Figure 8A:
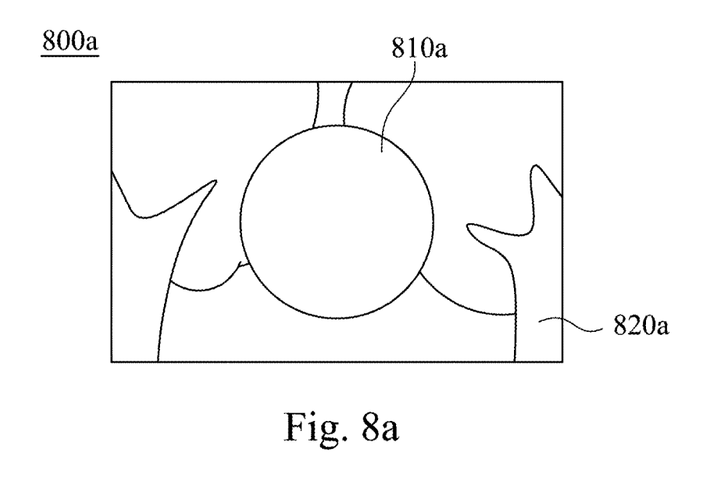
FIGS. 8a-8b illustrate an illustrative example of the image processing method in FIG. 2, in accordance with one embodiment of the present disclosure.
Figure 8B:
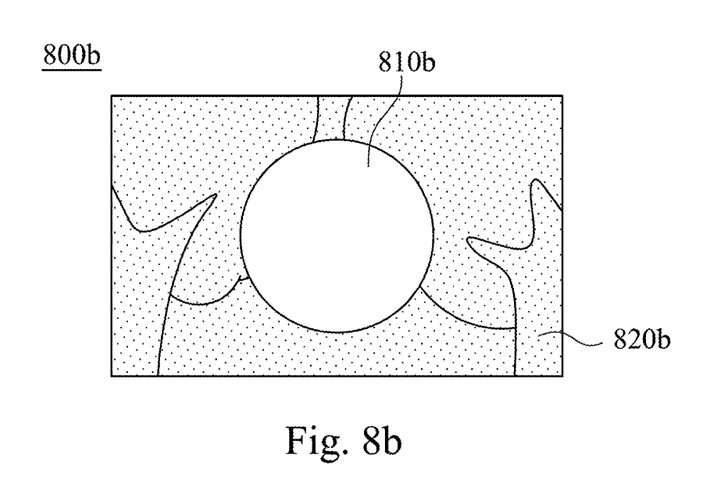

FIGS. 8a-8b illustrate an illustrative example of the image processing method 200 in FIG. 2, in accordance with one embodiment of the present disclosure. In this illustrative example, the captured image 800a displayed on the screen (not shown) includes a foreground portion 810a and a background portion 820a, in which the foreground portion 810a is a target object.

In one embodiment, the image effect applied to FIG. 8a is a brightness effect, and the adjustment level is a brightness level. By means of operations S210-S260 in FIG. 2, the processing unit 160 processes the captured image 800a to obtain a processed image 800b with a dark background portion 820b.

In one embodiment, the image effect applied to FIG. 8a is a saturation effect, and the adjustment level is a saturation level. By means of operations S210-S260 in FIG. 2, the processing unit 160 processes the captured image 800a to obtain a processed image 800b with a saturated background portion 820b.

In summary, the mobile device 100 can generate a processed image with adaptive image effect according to the dynamic dimension of the target object. As a result, the adjustment level of the image effect can be adjusted quickly and intuitively with the distance between the target object and the mobile device 100, such that a user can adjust the adjustment level of the image effect applied on the captured image by moving the mobile device 100 without using any additional user interface. In addition, the applied portion (e.g., the foreground portion or the background portion) of the captured image can also be adjusted by moving the mobile device 100.

Although the present invention has been described in considerable detail with reference to certain embodiments thereof, other embodiments are possible. Therefore, the scope of the appended claims should not be limited to the description of the embodiments contained herein.

What is claimed is:

1. An image processing method, suitable for a mobile device comprising a camera unit and a display unit, the image processing method comprising:
   separating a foreground portion and a background portion of a first image sensed by the camera unit;
   calculating a dimension of the foreground portion;
   generating an adjustment level that is positively correlated with the dimension of the foreground portion;
   applying an image effect at the adjustment level to the foreground portion or the background portion of the first image to generate a second image; and
   displaying the second image by the display unit;
   wherein the dimension of the foreground portion is one of a distance between two eyes, a size of a triangular area formed between two eyes and a nose, a second area of the foreground portion, and a percentage between the second area of the foreground portion and a first area of the first image.

2. The image processing method as claimed in claim 1, wherein the image effect is a bokeh effect, the adjustment level is a bokeh level, the dimension of the foreground portion is positively correlated with the bokeh level so as to adjust a blur difference between the foreground portion and the background portion.

3. The image processing method as claimed in claim 2, wherein the bokeh effect is applied to the background portion.

4. The image processing method as claimed in claim 2, wherein the bokeh effect is applied to the foreground portion.

5. The image processing method as claimed in claim 2, wherein the bokeh effect is applied to the foreground portion when the dimension of the foreground portion is lower than a threshold, and the bokeh effect is applied to the background portion when the dimension of the background portion is larger than the threshold.

6. The image processing method as claimed in claim 1, wherein the operation of calculating the dimension of the foreground portion comprises:
   identifying a face in the foreground portion;
   locating two eyes on the face; and
   calculating the distance between the two eyes, wherein the distance is regarded as the dimension of the foreground portion.

7. The image processing method as claimed in claim 1, wherein the operation of calculating the dimension of the foreground portion comprises:
   obtaining the first area of the first image;
   measuring the second area of the foreground portion; and
   calculating the percentage of the second area relative to the first area, wherein the percentage is regarded as the dimension of the foreground portion.

8. The image processing method as claimed in claim 1, wherein the adjustment level is linearly or exponentially correlated with the dimension of the foreground portion.

9. The image processing method as claimed in claim 1, wherein the image effect is a brightness effect, the adjustment level is a brightness level, the dimension of the foreground portion is positively correlated with the brightness level so as to adjust a brightness difference between the foreground portion and the background portion.

10. The image processing method as claimed in claim 1, wherein the image effect is a saturation effect, the adjustment level is a saturation level, the dimension of the foreground portion is positively correlated with the saturation level so as to adjust a saturation difference between the foreground portion and the background portion.

11. A mobile device comprising:
a camera unit configured to sense a first image;
a display unit;
a processing unit coupled to the camera unit and the display unit, the processing unit configured to:
  separate a foreground portion and a background portion of the first image;
  calculate a dimension of the foreground portion;
  generate an adjustment level that is positively correlated with the dimension of the foreground portion;
  apply an image effect at the adjustment level to the foreground portion or the background portion of the first image to generate a second image; and
  transmit the second image to the display unit to display the second image,
  wherein the dimension of the foreground portion is one of a distance between two eyes, a size of a triangular area formed between two eyes and a nose, a second area of the foreground portion, and a percentage between the second area of the foreground portion and a first area of the first image.

12. The mobile device as claimed in claim 11, wherein the image effect is a bokeh effect, the adjustment level is a bokeh level, the dimension of the foreground portion is positively correlated with the bokeh level so as to adjust a blur difference between the foreground portion and the background portion.

13. The mobile device as claimed in claim 12, wherein the bokeh effect is applied to the background portion.

14. The mobile device as claimed in claim 12, wherein the bokeh effect is applied to the foreground portion.

15. The mobile device as claimed in claim 12, wherein the bokeh effect is applied to the foreground portion when the dimension of the foreground portion is lower than a threshold, and the bokeh effect is applied to the background portion when the dimension of the background portion is larger than the threshold.

16. The mobile device as claimed in claim 11, wherein the processing unit is further configured to:
  identify a face in the foreground portion;
  locate two eyes on the face; and
  calculate the distance between the two eyes, wherein the distance is regarded as the dimension of the foreground portion.

17. The mobile device as claimed in claim 11, wherein the processing unit is further configured to:
  obtain the first area of the first image;
  measure the second area of the foreground portion; and
  calculate the percentage of the second area relative to the first area, wherein the percentage is regarded as the dimension of the foreground portion.

18. The mobile device as claimed in claim 11, wherein the adjustment level is linearly or exponentially correlated with the dimension of foreground portion.

19. The mobile device as claimed in claim 11, wherein the image effect is a brightness effect, the adjustment level is a brightness level, the dimension of the foreground portion is positively correlated with the brightness level so as to adjust a brightness difference between the foreground portion and the background portion.

20. The mobile device as claimed in claim 11, wherein the image effect is a saturation effect, the adjustment level is a saturation level, the dimension of the foreground portion is positively correlated with the saturation level so as to adjust a saturation difference between the foreground portion and the background portion.

* * * * *